(12) United States Patent
Nakada et al.

(10) Patent No.: US 10,808,669 B2
(45) Date of Patent: Oct. 20, 2020

(54) ENGINE SYSTEM

(71) Applicant: HONDA MOTOR CO., LTD., Tokyo (JP)

(72) Inventors: Yasuhiro Nakada, Wako (JP); Kenji Shibata, Wako (JP); Wataru Fukumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/655,324

(22) Filed: Oct. 17, 2019

(65) Prior Publication Data
US 2020/0158067 A1 May 21, 2020

(30) Foreign Application Priority Data

Nov. 21, 2018 (JP) ................................. 2018-218462

(51) Int. Cl.
*F02N 3/02* (2006.01)
*F02D 29/06* (2006.01)
*F02P 3/00* (2006.01)
*F02D 41/30* (2006.01)
*F02M 51/04* (2006.01)
*F02B 63/04* (2006.01)
*H02K 7/18* (2006.01)
*B60K 15/03* (2006.01)

(52) U.S. Cl.
CPC .............. *F02N 3/02* (2013.01); *F02B 63/042* (2013.01); *F02D 29/06* (2013.01); *F02D 41/3005* (2013.01); *F02D 41/3082* (2013.01); *F02M 51/04* (2013.01); *F02P 3/005* (2013.01); *H02K 7/1815* (2013.01); *B60K 15/03* (2013.01)

(58) Field of Classification Search
CPC ........ F02N 3/02; F02D 29/06; F02D 41/3005; F02D 41/3082; F02D 41/345; F02D 41/062; F02D 2041/2003; F02D 2400/14; F02P 3/005; F02M 51/04; F02B 63/042; H02K 7/1815; B60K 15/03
USPC ................. 123/179.5, 179.16, 179.28, 185.3
See application file for complete search history.

(56) References Cited

U.S. PATENT DOCUMENTS 7,930,092 B2  4/2011 Tokugawa et al.
2009/0063014 A1  3/2009 Tokugawa et al.

FOREIGN PATENT DOCUMENTS

JP H08-014078 A 1/1996
JP 4159040 B2 10/2008
JP 2009-057833 A 3/2009

*Primary Examiner* — Hai H Huynh
(74) *Attorney, Agent, or Firm* — Thomas Horstemeyer, LLP

(57) ABSTRACT

The present invention provides a batteryless engine system comprising a first detection unit configured to detect a rotation speed of an internal combustion engine, a second detection unit configured to detect a voltage of a capacitor in which charges are accumulated, and a control unit operated by a power supplied from a generator and configured to control supply of a power from the generator to an injector, a fuel pump, and an ignition device based on the rotation speed detected by the first detection unit and the voltage detected by the second detection unit in a starting period of the internal combustion engine by a recoil starter.

6 Claims, 6 Drawing Sheets

ENGINE SYSTEM

CROSS-REFERENCE TO RELATED APPLICATION(S)

This application claims priority to and the benefit of Japanese Patent Application No. 2018-218462 filed on Nov. 21, 2018, the entire disclosure of which is incorporated herein by reference.

BACKGROUND OF THE INVENTION

Field of the Invention

The present invention relates to an engine system having a recoil starter configured to start an internal combustion engine and, more particularly, to a batteryless engine system.

Description of the Related Art

An engine system that drives a generator by an internal combustion engine and generates power is a useful power supply in an area where a transmission network is not widespread or at the time of a failure of a commercial power supply. For an engine system including a recoil starter that is a manual operation type engine starting device, providing a backup battery to compensate for power shortage at the time of start is proposed in Japanese Patent No. 4159040. However, when the backup battery is provided, the cost and size of the engine system inevitably increase. Hence, as disclosed in Japanese Patent Laid-Open Nos. 8-014078 and 2009-057833, a technique of improving startability and user convenience (usability) is demanded even for an engine system without a backup battery, that is, a batteryless engine system.

To improve the startability and usability in the batteryless engine system, it is necessary to supply power from a low rotation to devices (engine devices) such as an ECU, an ignition unit, and a fuel pump. However, to supply the power required by the devices with a low rotation, it is necessary to increase the number of poles of the generator and make the capacity of the power supply circuit large, resulting in disadvantage in terms of size (weight) and cost.

SUMMARY OF THE INVENTION

The present invention provides an engine system advantageous in improving startability and usability without increasing the size and cost.

According to the present invention, there is provided a batteryless engine system including an internal combustion engine, a fuel tank configured to store fuel of the internal combustion engine, a generator configured to be driven by the internal combustion engine and generate power, a recoil starter configured to start the internal combustion engine, a capacitor configured to accumulate charges generated by the power generation, a first detection unit configured to detect a rotation speed of the internal combustion engine, a second detection unit configured to detect a voltage of the capacitor in which the charges are accumulated, an injector operated by the power supplied from the generator and configured to supply the fuel to the internal combustion engine, a fuel pump operated by the power supplied from the generator and configured to supply the fuel stored in the fuel tank to the injector, an ignition device operated by the power supplied from the generator and configured to ignite the fuel compressed by the internal combustion engine, and a control unit operated by the power supplied from the generator and configured to control supply of the power from the generator to the injector, the fuel pump, and the ignition device based on the rotation speed detected by the first detection unit and the voltage detected by the second detection unit in a starting period of the internal combustion engine by the recoil starter.

Further objects, features and advantages of the present invention will become apparent from the following detailed description of the embodiments of the present invention with reference to the accompanying drawings.

DESCRIPTION OF THE EMBODIMENTS

Figure 1:
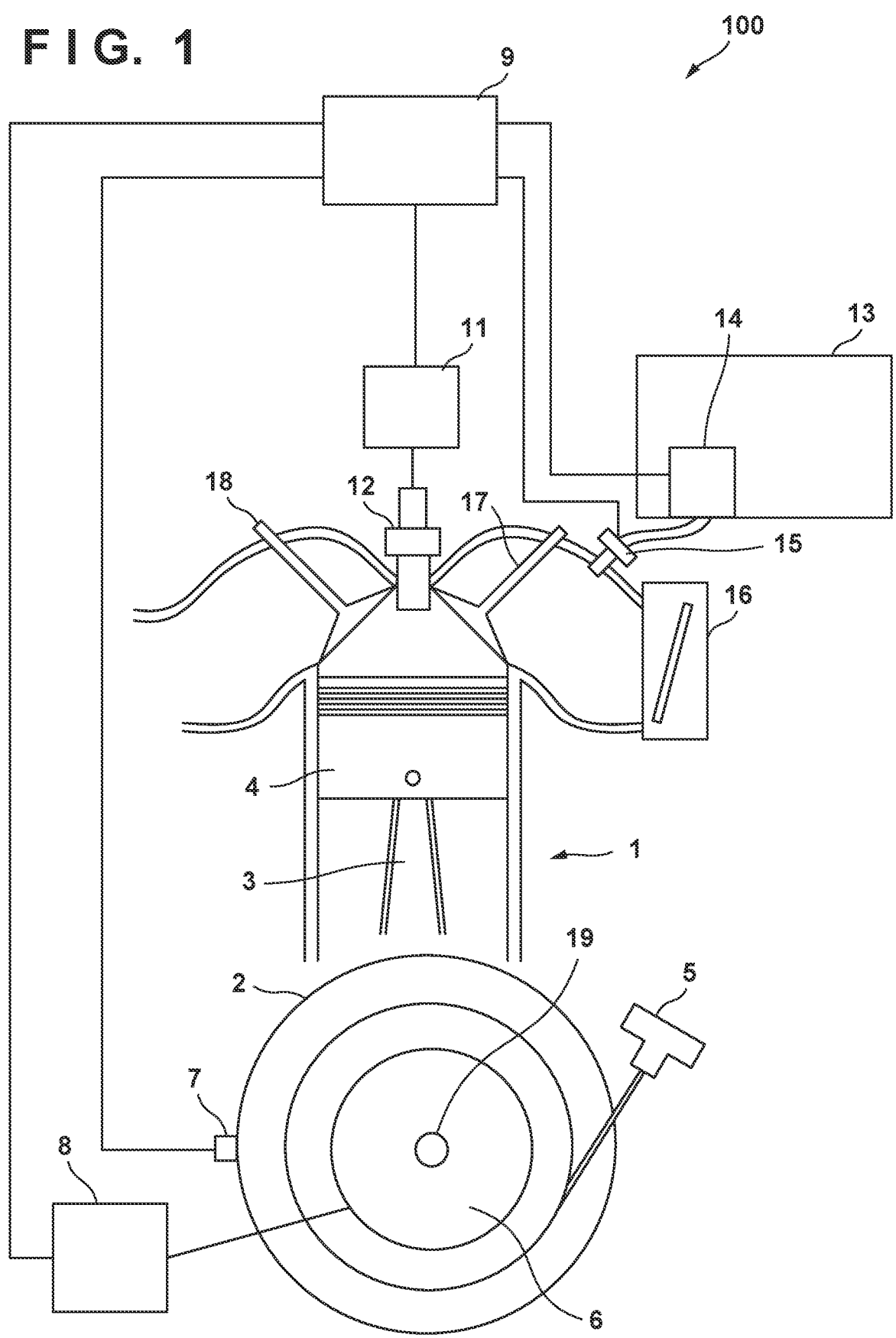
FIG. 1 is a schematic view showing the arrangement of a batteryless engine system according to an aspect of the present invention.

Preferred embodiments of the present invention will now be described in detail in accordance with the accompanying drawings. Note that the same reference numerals denote the same members throughout the drawings, and a repetitive description thereof will be omitted.

FIG. 1 is a schematic view showing the arrangement of a batteryless engine system 100 according to an aspect of the present invention. The engine system 100 is a power supply that supplies power to electronic devices, for example, in an area where a transmission network is not widespread or at the time of a failure of a commercial power supply. Note that the engine system 100 may be called an electronic fuel injection control system.

As shown in FIG. 1, the engine system 100 includes an internal combustion engine 1, a crankcase 2, a connecting rod 3, a piston 4, a recoil starter 5, a generator 6, a crank angle sensor 7, a power supply circuit 8, a control unit 9, an ignition device 11, a spark plug 12, a fuel tank 13, a fuel pump 14, an injector 15, a throttle motor 16, an intake valve 17, an exhaust valve 18, and a crankshaft 19.

The internal combustion engine 1 is, for example, a 4-stroke engine. The crankcase 2 stores the crankshaft 19. When the crankshaft 19 rotates, the piston 4 connected to the connecting rod 3 moves in the vertical direction in a cylinder.

The recoil starter 5 used to start the internal combustion engine 1 is connected to the crankshaft 19. A user (recoil operator) grasps and pulls (the handle of) the recoil starter 5, thereby rotating the crankshaft 19. The generator 6 is also connected to the crankshaft 19. When the crankshaft 19 rotates, the rotor of the generator 6 rotates and generates power. In this way, the generator 6 is driven by the internal combustion engine 1 to generate power.

The crank angle sensor 7 detects the crank angle of the crankshaft 19. The crank angle sensor 7 includes, for example, a Hall element configured to detect the magnetism of a magnet provided on a flywheel connected to the crankshaft 19.

The power supply circuit 8 includes a circuit that converts an AC generated by the generator 6 into a DC, a circuit that converts the level of a DC voltage, and the like. The power supply circuit 8 supplies the power generated by the generator 6 to the control unit 9. When the crankshaft 19 is rotated by the recoil starter 5, the generator 6 generates sufficient power for the control unit 9 to operate.

The control unit 9 includes an engine control unit (ECU), and controls supply of power from the generator 6 to the ignition device 11, the fuel pump 14, the injector 15, the throttle motor 16, and the like via the power supply circuit 8.

The ignition device 11 is operated by the power supplied from the generator 6, and supplies power (ignition power) to cause the spark plug 12 to cause spark discharge. The fuel tank 13 is a container that stores fuel of the internal combustion engine 1. The fuel pump 14 is a pump that is operated by the power supplied from the generator 6, and supplies the fuel stored in the fuel tank 13 to the injector 15. In this embodiment, the fuel pump 14 is provided in the fuel tank 13.

The throttle motor 16 is a motor operated by the power supplied from the generator 6 and configured to control the air inflow amount to the internal combustion engine 1. The intake valve 17 is a valve to be opened/closed by a cam configured to convert the rotary motion of the crankshaft 19 into a vertical motion, and the like. Basically, the intake valve 17 is opened in an intake stroke of the internal combustion engine 1 and closed in a compression stroke, an expansion stroke, and an exhaust stroke of the internal combustion engine 1.

The exhaust valve 18 is a valve to be opened/closed by a cam configured to convert the rotary motion of the crankshaft 19 into a vertical motion, and the like. Basically, the exhaust valve 18 is opened in the exhaust stroke of the internal combustion engine 1 and closed in the compression stroke, the expansion stroke, and the intake stroke of the internal combustion engine 1. Note that for smooth transition from the exhaust stroke to the intake stroke, a period (overlap) in which the intake valve 17 and the exhaust valve 18 are simultaneously opened may be provided.

In the engine system 100, the sum of powers (power consumptions) consumed by the control unit 9, the fuel pump 14, the ignition device 11, and the injector 15 sometimes reaches several ten watts. If such power is generated only by the generator 6 without using a backup battery, a large amount of recoil power is needed, and the user is required to do a great deal of labor. For example, at the early stage of a recoil operation, that is, in the starting period of the internal combustion engine 1 by the recoil starter 5, the user is sensitive to a load felt in operating the recoil starter 5. On the other hand, at the medium stage and ending stage of the recoil operation, the user is insensitive to the load felt in operating the recoil starter 5. When the recoil operation ends, and the internal combustion engine 1 starts rotating by a moment of inertia, the user feels no load anymore.

In this embodiment, in the starting period of the internal combustion engine 1 by the recoil starter 5, the control unit 9 limits supply of power from the generator 6 to the ignition device 11, the fuel pump 14, and the injector 15, thereby reducing the load felt by the user in operating the recoil starter 5. In this embodiment, the control unit 9 refers to the rotation speed of the internal combustion engine 1 and the voltage of a capacitor to be described later, and if the internal combustion engine 1 cannot autonomously rotate, does not supply power from the generator 6 to the ignition device 11, the fuel pump 14, and the injector 15. On the other hand, if the internal combustion engine 1 can autonomously rotate, the control unit 9 supplies power from the generator 6 to the ignition device 11, the fuel pump 14, and the injector 15. Accordingly, even in the batteryless engine system 100, the load felt by the user in operating the recoil starter 5 can be reduced in the starting period of the internal combustion engine 1.

If the rotation speed of the internal combustion engine 1 becomes equal to or more than a first threshold (equal to or more than a predetermined rotation speed), and the voltage of the capacitor to be described later becomes equal to or more than a second threshold (equal to or more than a predetermined voltage value), the control unit 9 supplies the power from the generator 6 to the ignition device 11, the fuel pump 14, and the injector 15. The first threshold and the second threshold are set in accordance with the rotation speed at which the internal combustion engine 1 can autonomously rotate (that is, the rotation speed that generates a moment of inertia for allowing the internal combustion engine 1 to autonomously rotate). In this embodiment, the voltage of the capacitor to be described later is used in the starting period of the internal combustion engine 1 by the recoil starter 5, thereby setting the first threshold to a rotation speed lower than the rotation speed at which the internal combustion engine 1 can autonomously rotate.

As described above, in this embodiment, the power from the generator 6 is not supplied to the ignition device 11, the fuel pump 14, and the injector 15 until the rotation speed of the internal combustion engine 1 becomes equal to or more than the first threshold, and the voltage of the capacitor to be described later becomes equal to or more than the second threshold. It is therefore possible to reduce the load felt by the user in operating the recoil starter 5 at the early stage of the recoil operation. In addition, at the ending stage of the recoil operation, the user is insensitive to the load felt in operating the recoil starter 5. Hence, even if the power from the generator 6 is supplied to the ignition device 11, the fuel pump 14, and the injector 15, the user hardly feels the load.

Figure 2:
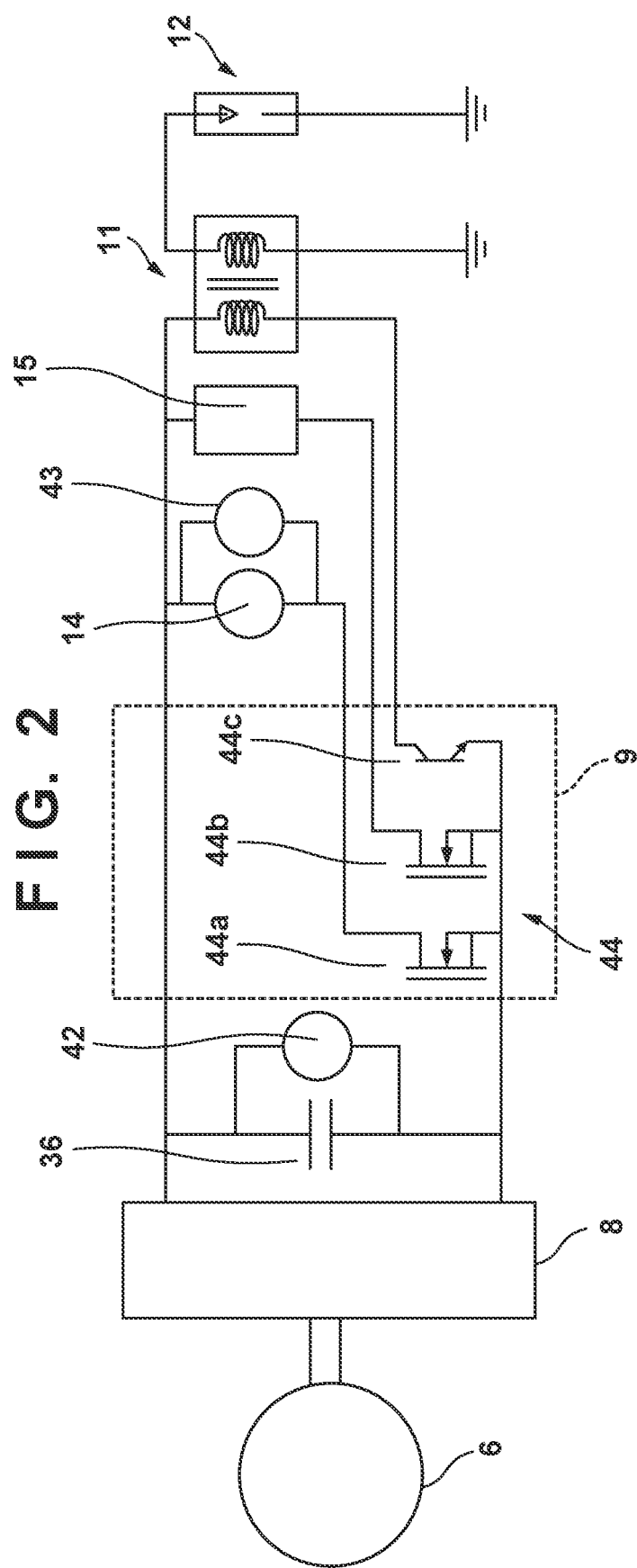
FIG. 2 is a view showing an arrangement associated with control of supply of power from a generator in the engine system shown in FIG. 1.

FIG. 2 is a view showing an arrangement associated with control of supply of power from the generator 6 in the engine system 100. As shown in FIG. 2, the engine system 100 further includes a capacitor 36 configured to accumulate charges (charge energy) generated by the power generation of the generator 6, a voltmeter (second detection unit) 42 configured to detect the voltage (voltage value) of the capacitor 36 in which charges are accumulated, and an ammeter 43 configured to detect a current (current value) flowing to the fuel pump 14. In addition, the control unit 9 includes a switch circuit 44 that implements control of a timing (power supply start timing) of supplying power from the generator 6 to each of the ignition device 11, the fuel pump 14, and the injector 15.

The capacitor 36 is a passive element that accumulates charges or emits the charges, and includes, for example, an electrolytic capacitor. In this embodiment, the capacitor 36 is assumed to be incorporated in the power supply circuit 8. However, the capacitor 36 may be provided independently of the power supply circuit 8.

The voltmeter 42 is of, for example, a movable coil type formed by a permanent magnet and a coil, and is connected in parallel with the capacitor 36. The ammeter 43 is a measurement device of, for example, a movable coil type formed by a permanent magnet and a coil, and has a small internal electrical resistance. The ammeter 43 is connected in series with the fuel pump 14. In fact, the ammeter 43 detects the voltage across the fuel pump 14, thereby detecting a current flowing to the fuel pump 14.

In this embodiment, the switch circuit 44 includes an n-type first MOSFET (Metal-Oxide-Semiconductor-Field-Effect Transistor) 44a, an n-type second MOSFET 44b, and a transistor 44c.

The first MOSFET 44a is provided on the power line of the fuel pump 14, and controls the power supply start timing to the fuel pump 14. The second MOSFET 44b is provided on the power line of the injector 15, and controls the power supply start timing to the injector 15. The transistor 44c is provided on the power line of the ignition device 11, and controls the power supply start timing to the ignition device 11.

Figure 3:
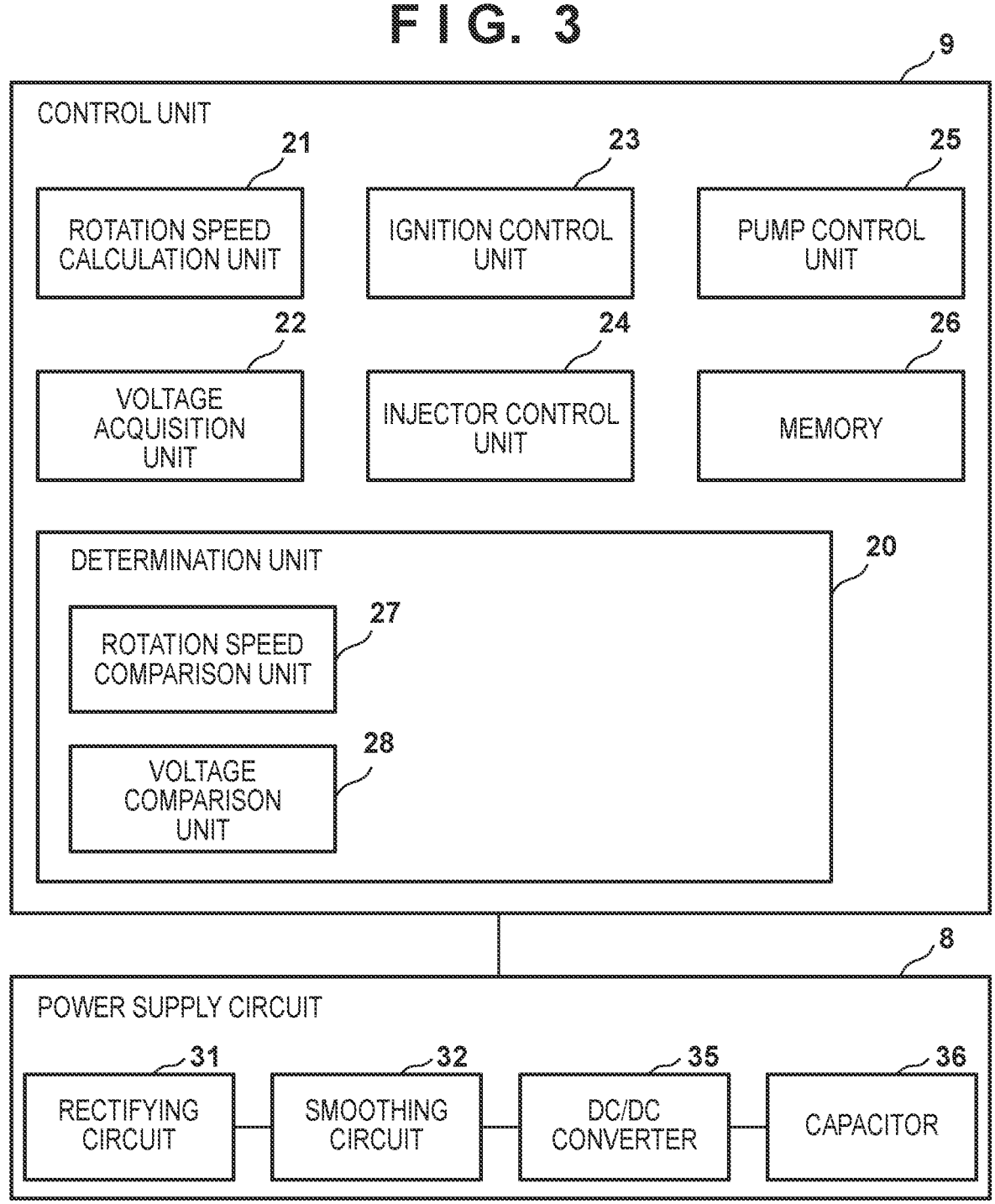
FIG. 3 is a block diagram showing the function of a control unit and the function of a power supply circuit.

FIG. 3 is a block diagram showing the function of the control unit 9 and the function of the power supply circuit 8. The control unit 9 includes a determination unit 20, a rotation speed calculation unit 21, a voltage acquisition unit 22, an ignition control unit 23, an injector control unit 24, a pump control unit 25, and a memory 26. The power supply circuit 8 includes a rectifying circuit 31, a smoothing circuit 32, a DC/DC converter 35, and the capacitor 36.

The rotation speed calculation unit 21 calculates (acquires) the rotation speed of the internal combustion engine 1 based on the interval of pulse signals output from the crank angle sensor 7. For example, the crank angle sensor 7 outputs nine pulses every time the crankshaft 19 rotates by 30°, and after that, does not output a pulse while the crankshaft 19 is rotating by 120°. Focusing on the former pulses, the pulse interval becomes short as the rotation speed of the crankshaft 19 rises. The pulse interval represents time needed by the crankshaft 19 to rotate by 30°. Hence, the rotation speed calculation unit 21 detects a pulse interval Rt using a timer or a counter, and acquires a rotation speed Ne of the internal combustion engine 1 by calculating (360°÷30°)÷Rt.

The voltage acquisition unit 22 acquires the voltage detected by the voltmeter 42 connected in parallel with the capacitor 36 as a voltage Vc of the capacitor 36.

Based on the rotation speed Ne of the internal combustion engine 1 acquired by the rotation speed calculation unit 21 and the voltage Vc of the capacitor 36 acquired by the voltage acquisition unit 22, the determination unit 20 determines whether the internal combustion engine 1 can autonomously rotate. A rotation speed comparison unit 27 compares the rotation speed Ne of the internal combustion engine 1 with a first threshold Ne_th, and determines whether the rotation speed Ne is equal to or more than the first threshold Ne_th. A voltage comparison unit 28 compares the voltage Vc of the capacitor 36 with a second threshold Vc_th, and determines whether the voltage Vc is equal to or more than the second threshold Vc_th.

If the rotation speed Ne of the internal combustion engine 1 is equal to or more than the first threshold Ne_th, and the voltage Vc of the capacitor 36 is equal to or more than the second threshold Vc_th, the determination unit 20 determines that the internal combustion engine 1 can autonomously rotate, and outputs an energization permission signal to permit supply of the power from the generator 6 to the ignition device 11, the fuel pump 14, and the injector 15. If the rotation speed Ne of the internal combustion engine 1 is less than the first threshold Ne_th, or the voltage Vc of the capacitor 36 is less than the second threshold Vc_th, the determination unit 20 may determine that the internal combustion engine 1 cannot autonomously rotate, and may not output the energization permission signal (or may output an energization non-permission signal not to permit supply of the power from the generator 6 to the ignition device 11, the fuel pump 14, and the injector 15).

If the determination unit 20 outputs the energization permission signal, the ignition control unit 23 supplies the power from the generator 6 to the ignition device 11 via the transistor 44c (starts energization). On the other hand, if the determination unit 20 does not output the energization permission signal, the ignition control unit 23 does not supply the power from the generator 6 to the ignition device 11 (does not start energization).

If the determination unit 20 outputs the energization permission signal, the injector control unit 24 supplies the power from the generator 6 to the injector 15 via the second MOSFET 44b. On the other hand, if the determination unit 20 does not output the energization permission signal, the injector control unit 24 does not supply the power from the generator 6 to the injector 15.

If the determination unit 20 outputs the energization permission signal, the pump control unit 25 supplies the power from the generator 6 to the fuel pump 14 via the first MOSFET 44a. On the other hand, if the determination unit 20 does not output the energization permission signal, the pump control unit 25 does not supply the power from the generator 6 to the fuel pump 14.

Note that the start of energization, that is, the power supply start timing is implemented by switching the first MOSFET 44a, the second MOSFET 44b, and the transistor 44c, which constitute the switch circuit 44, from OFF to ON, as described above.

The memory 26 is a storage device including a RAM, a ROM, and the like, and stores the first threshold Ne_th, the second threshold Vc_th, and the like.

The rectifying circuit 31 is a circuit that rectifies the AC generated by the generator 6. The smoothing circuit 32 is a circuit that smoothes a pulsating current generated by the rectifying circuit 31 to generate a DC, and generates, for example, a DC voltage of 12 V. The DC/DC converter 35 is a circuit that converts the level of a DC voltage, and converts, for example, a DC voltage of 12 V into a DC voltage of 5 V or a DC voltage of 3.3 V.

Figure 4:
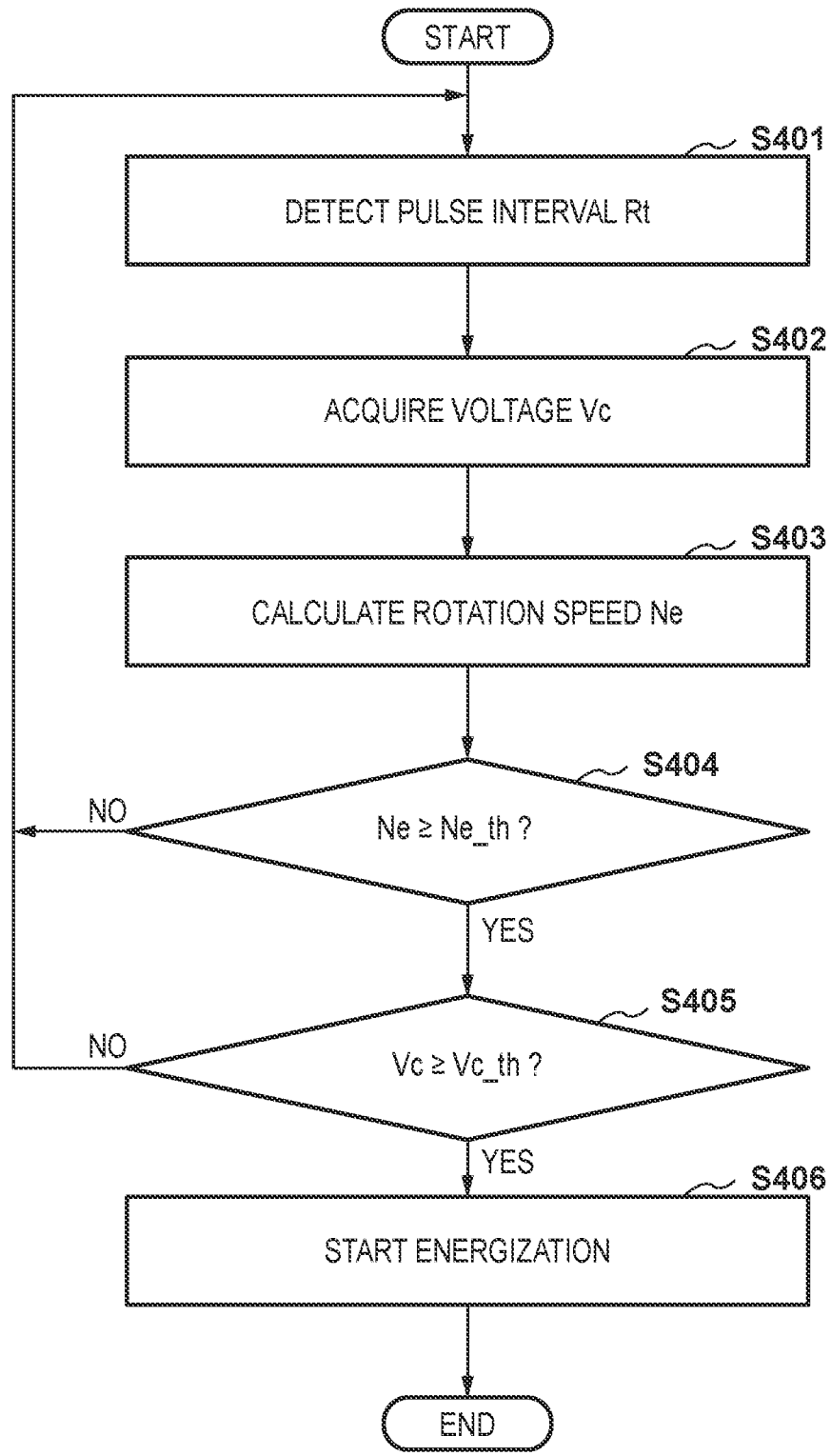
FIG. 4 is a flowchart for explaining control of supply of power from the generator in the starting period of an internal combustion engine.

FIG. 4 is a flowchart for explaining control of supply of power from the generator 6 in the starting period of the internal combustion engine 1. When activated upon receiving, via the power supply circuit 8, power generated by the generator 6, (each unit of) the control unit 9 executes the following processing.

In step S401, the control unit 9 (rotation speed calculation unit 21) detects the pulse interval Rt using a timer or a counter. Note that the timer or the counter may be provided outside the rotation speed calculation unit 21 as the detection unit (measurement unit) of the pulse interval Rt.

In step S402, the control unit 9 (voltage acquisition unit 22) acquires the voltage Vc of the capacitor 36. More specifically, as described above, the voltage detected by the voltmeter 42 is acquired as the voltage Vc of the capacitor 36.

In step S403, the control unit 9 (rotation speed calculation unit 21) calculates the rotation speed Ne of the internal combustion engine 1 based on the pulse interval Rt detected in step S401. At this time, the rotation speed calculation unit 21 may, for example, calculate the rotation speed Ne while excluding an extremely long pulse interval.

In step S404, the control unit 9 (rotation speed comparison unit 27) determines whether the rotation speed Ne of the internal combustion engine 1 calculated in step S403 is equal to or more than the first threshold Ne_th read out from the memory 26. If the rotation speed Ne is not equal to or more than the first threshold Ne_th, the process returns to step S401 to detect the next pulse interval Rt. On the other hand, if the rotation speed Ne is equal to or more than the first threshold Ne_th, the process advances to step S405.

In step S405, the control unit 9 (voltage comparison unit 28) determines whether the voltage Vc of the capacitor 36 acquired in step S402 is equal to or more than the second threshold Vc_th read out from the memory 26. If the voltage Vc of the capacitor 36 is not equal to or more than the second threshold Vc_th, the internal combustion engine 1 cannot autonomously rotate even if the rotation speed Ne of the internal combustion engine 1 is equal to or more than the first threshold Ne_th read out from the memory 26. For this reason, the process returns to step S401 to detect the next pulse interval Rt. On the other hand, if the voltage Vc of the capacitor 36 is equal to or more than the second threshold Vc_th, the internal combustion engine 1 can autonomously rotate. Hence, the process advances to step S406.

In step S406, the control unit 9 (the ignition control unit 23, the pump control unit 25, and the injector control unit 24) starts energization to the ignition device 11, the fuel pump 14, and the injector 15 via the switch circuit 44 (the transistor 44c, the first MOSFET 44a, and the second MOSFET 44b) (that is, the power from the generator 6 is supplied to the ignition device 11, the fuel pump 14, and the injector 15).

As described above, at the time of start of the internal combustion engine 1 by the recoil starter 5, the control unit 9 does not supply the power from the generator 6 to auxiliary devices (the ignition device 11, the fuel pump 14, and the injector 15) concerning fuel injection and ignition until the rotation speed Ne of the internal combustion engine 1 becomes equal to or more than the first threshold Ne_th, and the voltage Vc of the capacitor 36 becomes equal to or more than the second threshold Vc_th. When the rotation speed Ne of the internal combustion engine 1 becomes equal to or more than the first threshold Ne_th, and the voltage Vc of the capacitor 36 becomes equal to or more than the second threshold Vc_th, the control unit 9 supplies the power from the generator 6 to the auxiliary devices concerning fuel injection and ignition. In other words, in the engine system 100, during the period from the start of pulling of the recoil starter 5 until the rotation speed Ne of the internal combustion engine 1 becomes equal to or more than the first threshold Ne_th, and the voltage Vc of the capacitor 36 becomes equal to or more than the second threshold Vc_th, the power is not supplied to the auxiliary devices concerning fuel injection and ignition. In the period after the rotation speed Ne of the internal combustion engine 1 becomes equal to or more than the first threshold Ne_th, and the voltage Vc of the capacitor 36 becomes equal to or more than the second threshold Vc_th, the power is supplied to the auxiliary devices concerning fuel injection and ignition. This can reduce the load felt by the user in operating the recoil starter 5 at the time of start of the internal combustion engine 1. Hence, in the engine system 100, it is possible to improve startability and usability without increasing the size and cost.

In addition, in the starting period of the internal combustion engine 1 by the recoil starter 5, more specifically, after the rotation speed Ne of the internal combustion engine 1 becomes equal to or more than the first threshold Ne_th, and the voltage Vc of the capacitor 36 becomes equal to or more than the second threshold Vc_th, the control unit 9 may supply the power from the generator 6 to the ignition device 11, the fuel pump 14, and the injector 15 not at once but stepwise. This can suppress the peak of the power (supplied power amount) supplied from the generator 6 to the control unit 9, the ignition device 11, the fuel pump 14, and the injector 15. Hence, it is possible to further reduce the load felt by the user in operating the recoil starter 5 at the time of start of the internal combustion engine 1.

At the time of start of the internal combustion engine 1 or in the operation period, the fuel amount needed by the internal combustion engine 1 depends on the magnitude of the load operated by the power supplied from the engine system 100. Hence, the control unit 9 (pump control unit 25) may PWM-control the power (energization time) supplied from the generator 6 to the fuel pump 14 in accordance with the magnitude of the load (that is the fuel amount needed to start the internal combustion engine 1). For example, the length of the ON period (ON duty) of a pulse-shaped driving signal supplied to the fuel pump 14 is variably controlled in accordance with the magnitude of the load. This can suppress the power consumption and the heat generation amount of the fuel pump 14.

Figure 5:
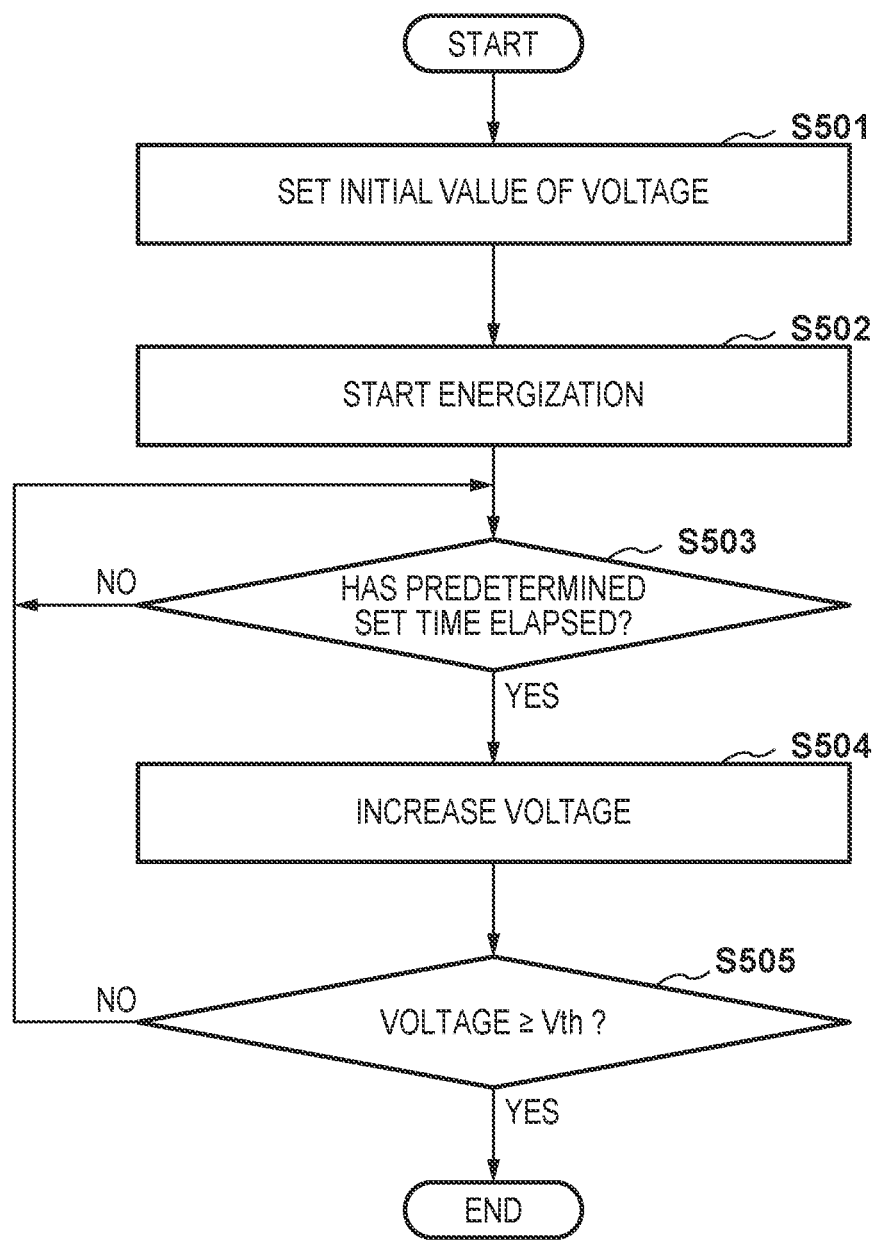
FIG. 5 is a flowchart for explaining an example of PWM control concerning supply of power from the generator to a fuel pump.

FIG. 5 is a flowchart for explaining an example of PWM control concerning supply of power from the generator 6 to the fuel pump 14. The control unit 9, more specifically, the pump control unit 25 executes the following processing.

In step S501, the pump control unit 25 sets the initial value of the voltage to be supplied (applied) to the fuel pump 14.

In step S502, the pump control unit 25 starts energization to the fuel pump 14 via the first MOSFET 44a based on the initial value of the voltage set in step S501 (that is, the power from the generator 6 is supplied to the fuel pump 14).

In step S503, the pump control unit 25 determines whether a predetermined set time has elapsed. Here, if the process advances from step S502 to step S503, it is determined whether the set time has elapsed from the start of energization (step S502) to the fuel pump 14. If the set time has not elapsed, step S503 is repeated until the set time elapses. On the other hand, if the set time has elapsed, the process advances to step S504.

In step S504, the pump control unit 25 increases the voltage supplied (applied) from the generator 6 to the fuel pump 14. The ratio (increase amount) of increasing the voltage supplied from the generator 6 to the fuel pump 14 can arbitrarily be set. For example, the ratio may always be constant, or may be changed in accordance with the time from the start of energization to the fuel pump 14.

In step S505, the pump control unit 25 determines whether the voltage increased in step S504 is equal to or more than a third threshold (voltage value) Vth. If the voltage increased in step S504 is not equal to or more than the third threshold Vth, the process returns to step S503 to increase the voltage supplied to the fuel pump 14 and then determine whether the set time has elapsed. On the other hand, if the voltage increased in step S504 is equal to or more than the third threshold Vth, the processing is ended. Note that the third threshold Vth is set to, for example, the upper limit value of the voltage suppliable to the fuel pump 14 and stored in the memory 26.

As described above, in the PWM control concerning supply of the power from the generator 6 to the fuel pump 14, the power supplied from the generator 6 to the fuel pump 14 may be controlled not by feedback control but by an open loop. However, instead of performing PWM control concerning supply of the power from the generator 6 to the fuel pump 14 by an open loop, the power from the generator 6 to the fuel pump 14 may be feedback-controlled, as will be described below with reference to FIG. 6.

Figure 6:
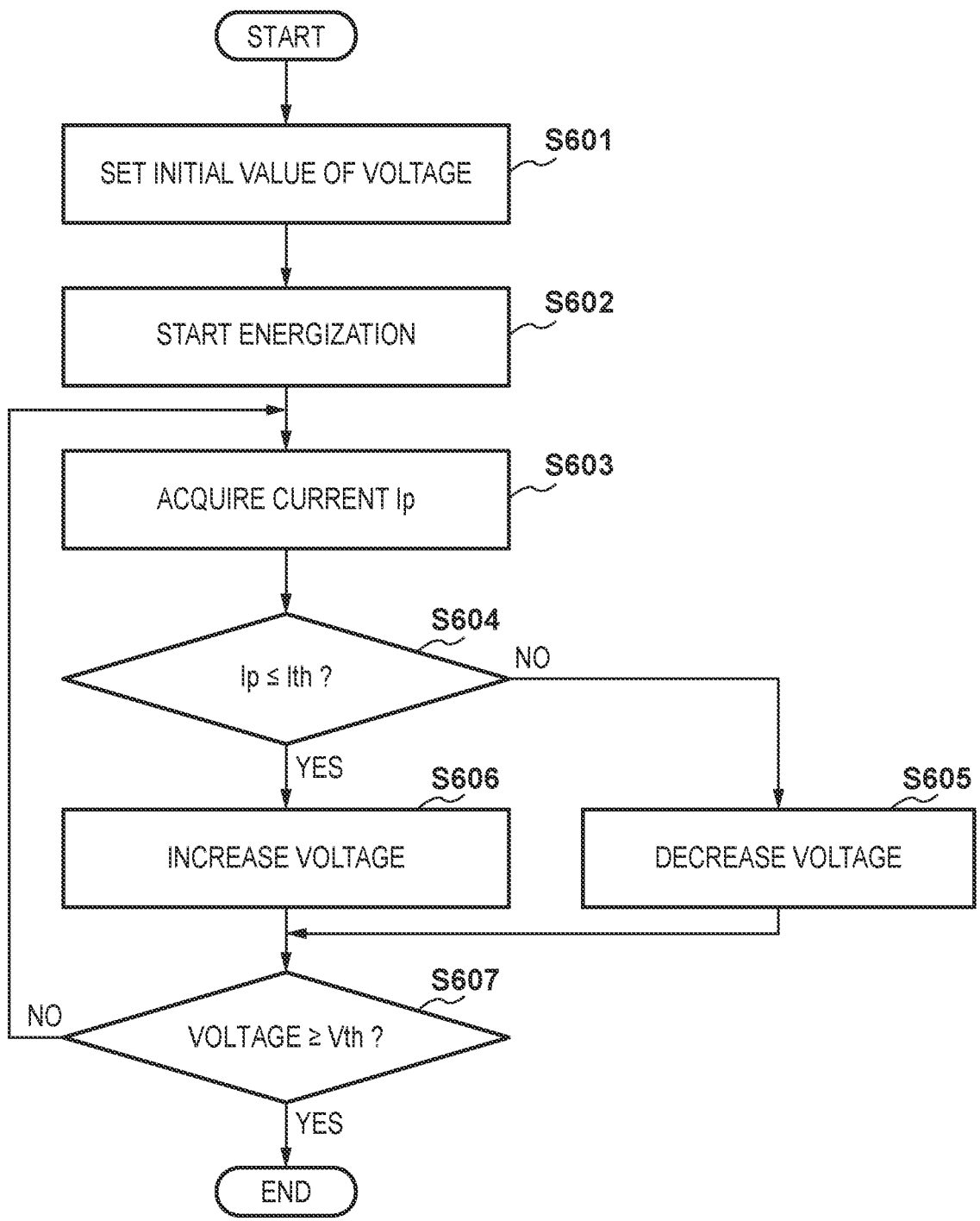
FIG. 6 is a flowchart for explaining an example of PWM control concerning supply of power from the generator to a fuel pump.

FIG. 6 is a flowchart for explaining an example of PWM control concerning supply of power from the generator 6 to the fuel pump 14. The control unit 9, more specifically, the pump control unit 25 executes the following processing. Note that steps S601, S602, S606, and S607 are the same as steps S501, S502, S504, and S505, respectively, and a detailed description thereof will be omitted here.

In step S603, the pump control unit 25 acquires a current Ip flowing to the fuel pump 14. More specifically, as described above, a current detected by the ammeter 43 is acquired as the current Ip flowing to the fuel pump 14.

In step S604, the pump control unit 25 determines whether the current Ip acquired in step S603 is equal to or less than a fourth threshold (current value) Ith. If the current Ip acquired in step S603 is not equal to or less than the fourth threshold Ith, the process advances to step S605. On the other hand, if the current Ip acquired in step S603 is equal to or less than the fourth threshold Ith, the process advances to step S606. Note that the fourth threshold Ith is set based on, for example, the upper limit value of the voltage suppliable to the fuel pump 14 and stored in the memory 26.

In step S605, the pump control unit 25 decreases the voltage supplied (applied) from the generator 6 to the fuel pump 14. The ratio (decrease amount) of decreasing the voltage supplied from the generator 6 to the fuel pump 14 can arbitrarily be set. For example, the ratio may always be constant, or may be changed in accordance with the time from the start of energization to the fuel pump 14.

SUMMARY OF EMBODIMENT

1. According to this embodiment, there is provided a batteryless engine system (for example, 100) characterized by comprising:
an internal combustion engine (for example, 1);
a fuel tank (for example, 13) configured to store fuel of the internal combustion engine;
a generator (for example, 6) configured to be driven by the internal combustion engine and generate power;
a recoil starter (for example, 5) configured to start the internal combustion engine;
a capacitor (for example, 36) configured to accumulate charges generated by the power generation;
a first detection unit (for example, 7) configured to detect a rotation speed of the internal combustion engine;
a second detection unit (for example, 42) configured to detect a voltage of the capacitor in which the charges are accumulated;
an injector (for example, 15) operated by the power supplied from the generator and configured to supply the fuel to the internal combustion engine;
a fuel pump (for example, 14) operated by the power supplied from the generator and configured to supply the fuel stored in the fuel tank to the injector;
an ignition device (for example, 11) operated by the power supplied from the generator and configured to ignite the fuel compressed by the internal combustion engine; and
a control unit (for example, 9) operated by the power supplied from the generator and configured to control supply of the power from the generator to the injector, the fuel pump, and the ignition device based on the rotation speed detected by the first detection unit and the voltage detected by the second detection unit in a starting period of the internal combustion engine by the recoil starter.

According to this embodiment, it is possible to provide an engine system advantageous in improving startability and usability without increasing the size and cost.

2. The engine system (for example, 100) according to the above-described embodiment,
wherein in the starting period of the internal combustion engine by the recoil starter, the control unit (for example, 9, 20) determines based on the rotation speed detected by the first detection unit and the voltage detected by the second detection unit whether the internal combustion engine can autonomously rotate, if the internal combustion engine cannot autonomously rotate, does not supply the power from the generator to the injector, the fuel pump, and the ignition device, and if the internal combustion engine can autonomously rotate, supplies the power from the generator to the injector, the fuel pump, and the ignition device.

According to this embodiment, it is possible to reduce the load felt by the user in operating the recoil starter at the time of start of the internal combustion engine.

3. The engine system (for example, 100) according to the above-described embodiment,
wherein in the starting period of the internal combustion engine by the recoil starter, the control unit (for example, 9, 27, 28) does not supply the power from the generator to the injector, the fuel pump, and the ignition device until the rotation speed detected by the first detection unit becomes not less than a first threshold, and the voltage detected by the second detection unit becomes not less than a second threshold, and supplies the power from the generator to the injector, the fuel pump, and the ignition device if the rotation speed detected by the first detection unit becomes not less than the first threshold, and the voltage detected by the second detection unit becomes not less than the second threshold.

According to this embodiment, it is possible to reduce the load felt by the user in operating the recoil starter at the time of start of the internal combustion engine.

4. The engine system (for example, 100) according to the above-described embodiment,
wherein in the starting period of the internal combustion engine by the recoil starter, the control unit (for example, 9) supplies the power from the generator to the injector, the fuel pump, and the ignition device stepwise.

According to this embodiment, it is possible to suppress the peak of the power (supplied power amount) supplied from the generator to the control unit, the ignition device, the fuel pump, and the injector.

5. The engine system (for example, 100) according to the above-described embodiment, wherein the control unit (for example, 9, 25) PWM-controls the power supplied from the generator to the fuel pump.

According to this embodiment, it is possible to suppress the power consumption and the heat generation amount of the fuel pump.

6. The engine system (for example, 100) according to the above-described embodiment,
wherein in the starting period of the internal combustion engine, the control unit (for example, 9, 25) PWM-controls the power supplied from the generator to the fuel pump in accordance with a fuel amount needed to start the internal combustion engine.

According to this embodiment, it is possible to suppress the power consumption and the heat generation amount of the fuel pump.

Preferred embodiments have been described above. However, the present invention is not limited to these embodiments, as a matter of course, and various changes and modifications can be made within the spirit and scope of the present invention.

What is claimed is:

1. A batteryless engine system comprising:
   an internal combustion engine;
   a fuel tank configured to store fuel of the internal combustion engine;
   a generator configured to be driven by the internal combustion engine and generate power;
   a recoil starter configured to start the internal combustion engine;
   a capacitor configured to accumulate charges generated by the power generation;
   a first detection unit configured to detect a rotation speed of the internal combustion engine;
   a second detection unit configured to detect a voltage of the capacitor in which the charges are accumulated;
   an injector operated by the power supplied from the generator and configured to supply the fuel to the internal combustion engine;
   a fuel pump operated by the power supplied from the generator and configured to supply the fuel stored in the fuel tank to the injector;
   an ignition device operated by the power supplied from the generator and configured to ignite the fuel compressed by the internal combustion engine; and
   a control unit operated by the power supplied from the generator and configured to control supply of the power from the generator to the injector, the fuel pump, and the ignition device based on the rotation speed detected by the first detection unit and the voltage detected by the second detection unit in a starting period of the internal combustion engine by the recoil starter.

2. The system according to claim 1, wherein in the starting period of the internal combustion engine by the recoil starter, the control unit determines based on the rotation speed detected by the first detection unit and the voltage detected by the second detection unit whether the internal combustion engine can autonomously rotate, if the internal combustion engine cannot autonomously rotate, does not supply the power from the generator to the injector, the fuel pump, and the ignition device, and if the internal combustion engine can autonomously rotate, supplies the power from the generator to the injector, the fuel pump, and the ignition device.

3. The system according to claim 1, wherein in the starting period of the internal combustion engine by the recoil starter, the control unit does not supply the power from the generator to the injector, the fuel pump, and the ignition device until the rotation speed detected by the first detection unit becomes not less than a first threshold, and the voltage detected by the second detection unit becomes not less than a second threshold, and supplies the power from the generator to the injector, the fuel pump, and the ignition device if the rotation speed detected by the first detection unit becomes not less than the first threshold, and the voltage detected by the second detection unit becomes not less than the second threshold.

4. The system according to claim 1, wherein in the starting period of the internal combustion engine by the recoil starter, the control unit supplies the power from the generator to the injector, the fuel pump, and the ignition device stepwise.

5. The system according to claim 1, wherein the control unit PWM-controls the power supplied from the generator to the fuel pump.

6. The system according to claim 5, wherein in the starting period of the internal combustion engine, the control unit PWM-controls the power supplied from the generator to the fuel pump in accordance with a fuel amount needed to start the internal combustion engine.

* * * * *